US010781622B2

(12) United States Patent
Barton

(10) Patent No.: US 10,781,622 B2
(45) Date of Patent: *Sep. 22, 2020

(54) OVERHEAD TRUCK DOOR OPENING AND CLOSING MECHANISM

(71) Applicant: Barton Family Limited Partnership, Hartville, OH (US)

(72) Inventor: Robert G. Barton, Hartville, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/404,537

(22) Filed: May 6, 2019

(65) Prior Publication Data

US 2019/0301224 A1    Oct. 3, 2019

Related U.S. Application Data

(63) Continuation of application No. 15/695,806, filed on Sep. 5, 2017, now Pat. No. 10,280,672, which is a continuation-in-part of application No. 15/011,289, filed on Jan. 29, 2016, now Pat. No. 10,076,951.

(60) Provisional application No. 62/109,092, filed on Jan. 29, 2015, provisional application No. 62/384,020, filed on Sep. 6, 2016.

(51) Int. Cl.
*B60J 5/14* (2006.01)
*E05F 11/54* (2006.01)
*E05F 15/681* (2015.01)
*E05F 15/686* (2015.01)
*B60J 5/10* (2006.01)
*E05D 15/24* (2006.01)

(52) U.S. Cl.
CPC ............. *E05F 11/54* (2013.01); *B60J 5/14* (2013.01); *E05F 15/681* (2015.01); *B60J 5/108* (2013.01); *E05D 15/24* (2013.01); *E05F 15/686* (2015.01); *E05Y 2201/678* (2013.01); *E05Y 2900/516* (2013.01); *E05Y 2900/532* (2013.01)

(58) Field of Classification Search
CPC .... B60J 5/14; B60J 5/108; E05F 11/54; E05F 15/681; E05F 15/686; E05F 15/684; E05Y 2201/668; E05Y 2900/516; E06B 2009/785

See application file for complete search history.

(56) References Cited

U.S. PATENT DOCUMENTS

| 1,431,852 | A | * | 10/1922 | Treiber | B61D 49/00 40/318 |
| 1,515,372 | A | * | 11/1924 | Smith | E06B 9/90 188/69 |
| 1,550,237 | A | * | 8/1925 | Beckman | E06B 9/54 160/26 |
| 1,784,292 | A | * | 12/1930 | Johnson | E05D 15/24 160/113 |

(Continued)

*Primary Examiner* — Johnnie A. Shablack
(74) *Attorney, Agent, or Firm* — Zollinger & Burleson Ltd.

(57) ABSTRACT

An opening and closing mechanism for a roll-up cargo door for a truck is intended to decrease injuries to the people who load and unload items from box trucks and semi-trailers. The mechanism allows the user to open and close the overhead roll-up door of these trucks while standing firmly and safely on the ground at the rear corner of the truck. The door opening and closing mechanism is in the form of a loop of material that is attached to a lower portion of the roll-up door and a guide disposed near the top of the door frame. The loop is disposed along one of the vertical frame members of the door so that it is out of the way of the cargo hold when the door is open.

16 Claims, 21 Drawing Sheets

(56) References Cited

U.S. PATENT DOCUMENTS

| | | | | |
|---|---|---|---|---|
| 1,889,226 A * | 11/1932 | Steffen | E06B 9/308 | 160/170 |
| 1,948,262 A * | 2/1934 | Gabriel | E06B 9/54 | 160/31 |
| 2,243,771 A * | 5/1941 | Nye | E06B 9/68 | 160/265 |
| 2,607,410 A * | 8/1952 | McKee | E05D 13/1215 | 160/191 |
| 2,684,846 A * | 7/1954 | Beall | E05F 9/00 | 160/193 |
| 2,736,073 A * | 2/1956 | Pardoe | B66B 13/303 | 49/370 |
| 3,160,200 A * | 12/1964 | McKee | E05D 13/1261 | 160/189 |
| 3,180,401 A * | 4/1965 | Gambon | E06B 9/90 | 160/265 |
| 3,894,571 A * | 7/1975 | Hinchliff | E05D 15/165 | 160/201 |
| 4,178,978 A * | 12/1979 | Burnham | E06B 9/78 | 160/133 |
| 4,690,195 A * | 9/1987 | Taylor | E06B 9/70 | 160/133 |
| 4,800,946 A * | 1/1989 | Rosenoy | E06B 9/13 | 160/133 |
| 4,815,515 A * | 3/1989 | Lee | E06B 9/40 | 160/23.1 |
| 4,862,554 A * | 9/1989 | Chojnacki | B60J 5/108 | 16/412 |
| 4,865,109 A * | 9/1989 | Sherman | E06B 9/78 | 160/321 |
| 5,129,442 A * | 7/1992 | Warner | E05D 13/1215 | 160/265 |
| 5,222,541 A * | 6/1993 | Hornberger | E06B 9/13 | 160/190 |
| 5,572,829 A * | 11/1996 | Stoltenberg | E05D 15/165 | 49/200 |
| 5,655,591 A * | 8/1997 | Knutson | E06B 9/58 | 160/265 |
| 5,758,705 A * | 6/1998 | Wagner | E06B 9/13 | 160/265 |
| 6,250,359 B1 * | 6/2001 | Lorio | E06B 9/326 | 160/178.1 V |
| 6,276,744 B1 * | 8/2001 | Huber | B60J 5/14 | 160/181 |
| 6,530,414 B2 * | 3/2003 | Mayr | E06B 3/6722 | 160/310 |
| 6,719,033 B2 * | 4/2004 | Stoltenberg | E05D 13/1261 | 160/133 |
| 6,955,208 B2 * | 10/2005 | Kim | E06B 9/326 | 160/178.1 V |
| 7,481,260 B2 * | 1/2009 | Hagen | E06B 9/42 | 160/265 |
| 7,581,578 B2 * | 9/2009 | Coenraets | E06B 9/40 | 160/267.1 |
| 8,246,007 B2 * | 8/2012 | Manvel | E06B 9/326 | 254/1 |
| 8,528,622 B2 * | 9/2013 | Ehrlich | E05D 13/1261 | 160/191 |
| 8,726,467 B1 * | 5/2014 | Smith | B65H 75/425 | 16/412 |
| 8,899,297 B2 * | 12/2014 | Mazej | E06B 9/08 | 160/133 |
| 9,919,588 B1 * | 3/2018 | Kirkland | B60J 5/108 | |
| 10,076,951 B2 * | 9/2018 | Barton | E05F 11/54 | |
| 10,280,672 B2 * | 5/2019 | Barton | E05F 15/681 | |
| 2008/0142169 A1 * | 6/2008 | Dekker | E06B 9/322 | 160/188 |
| 2009/0013497 A1 * | 1/2009 | Squyres | E05F 11/54 | 16/71 |
| 2011/0146920 A1 * | 6/2011 | Mazej | E06B 9/08 | 160/311 |
| 2016/0221423 A1 * | 8/2016 | Barton | E05F 11/54 | |
| 2017/0009507 A1 * | 1/2017 | Newman | E05F 11/48 | |
| 2018/0106089 A1 * | 4/2018 | Barton | E05F 15/681 | |

* cited by examiner

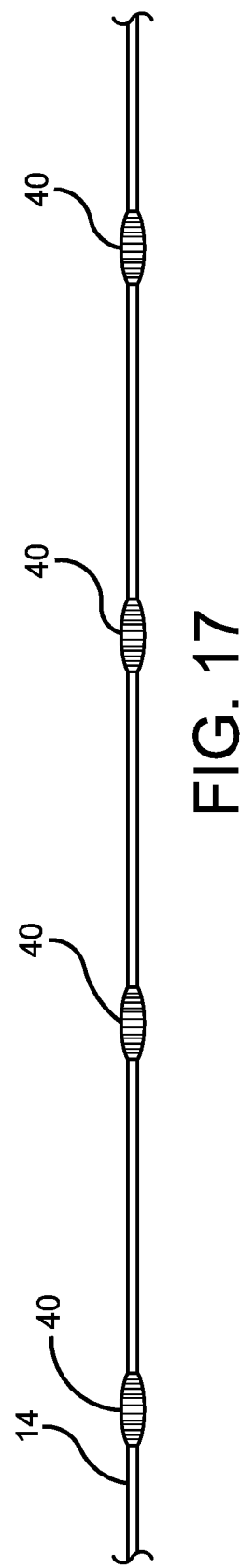

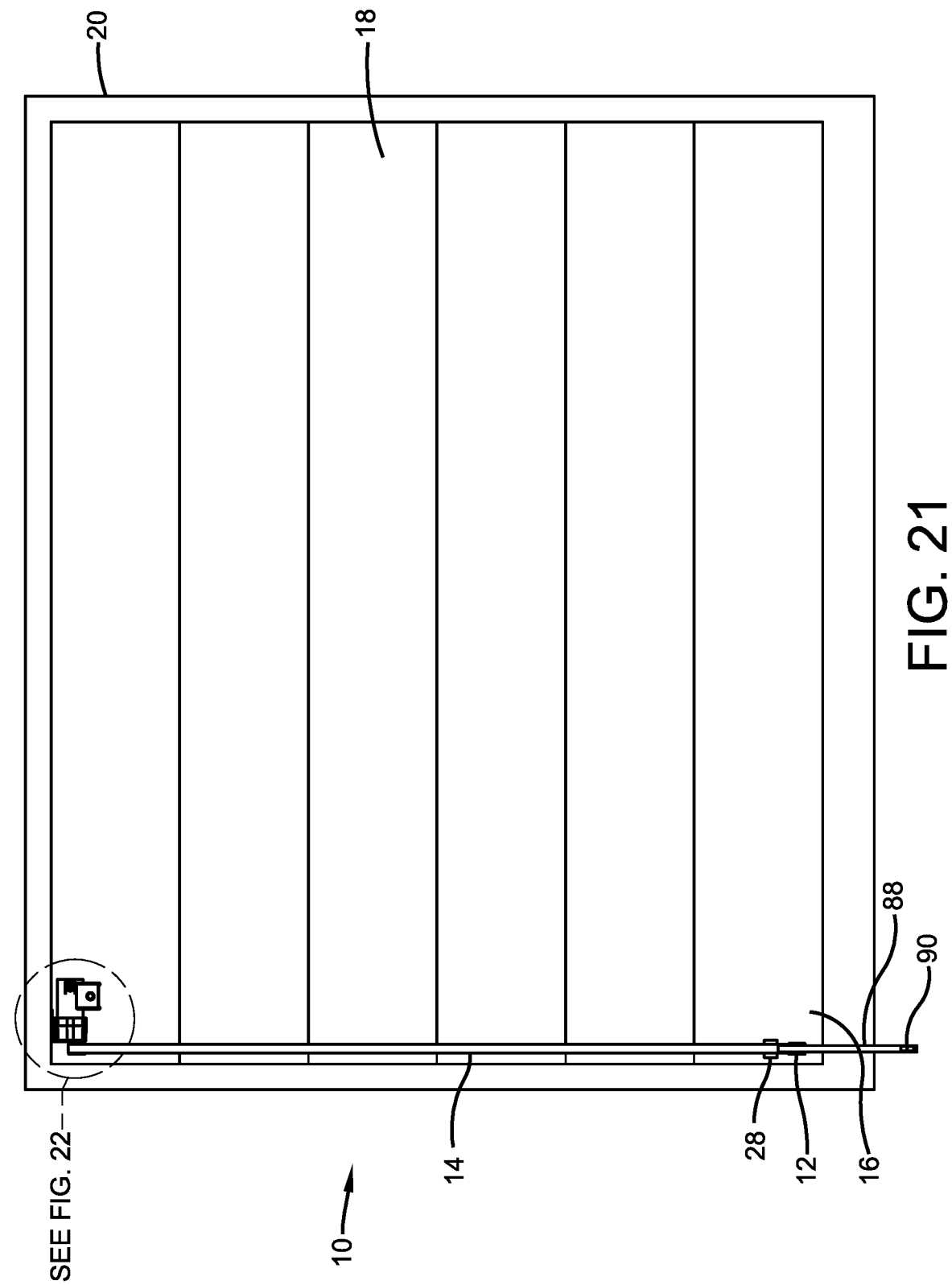

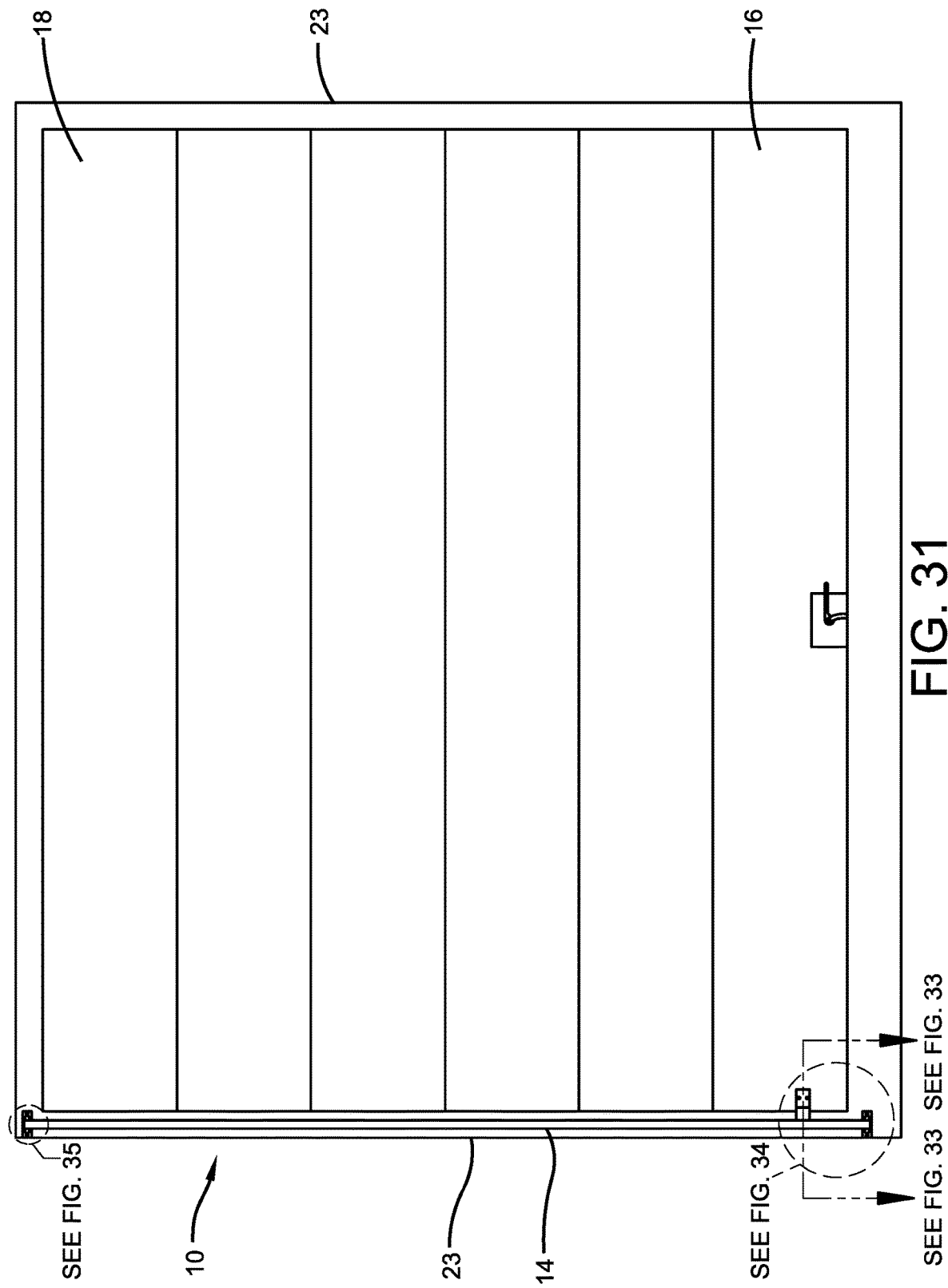

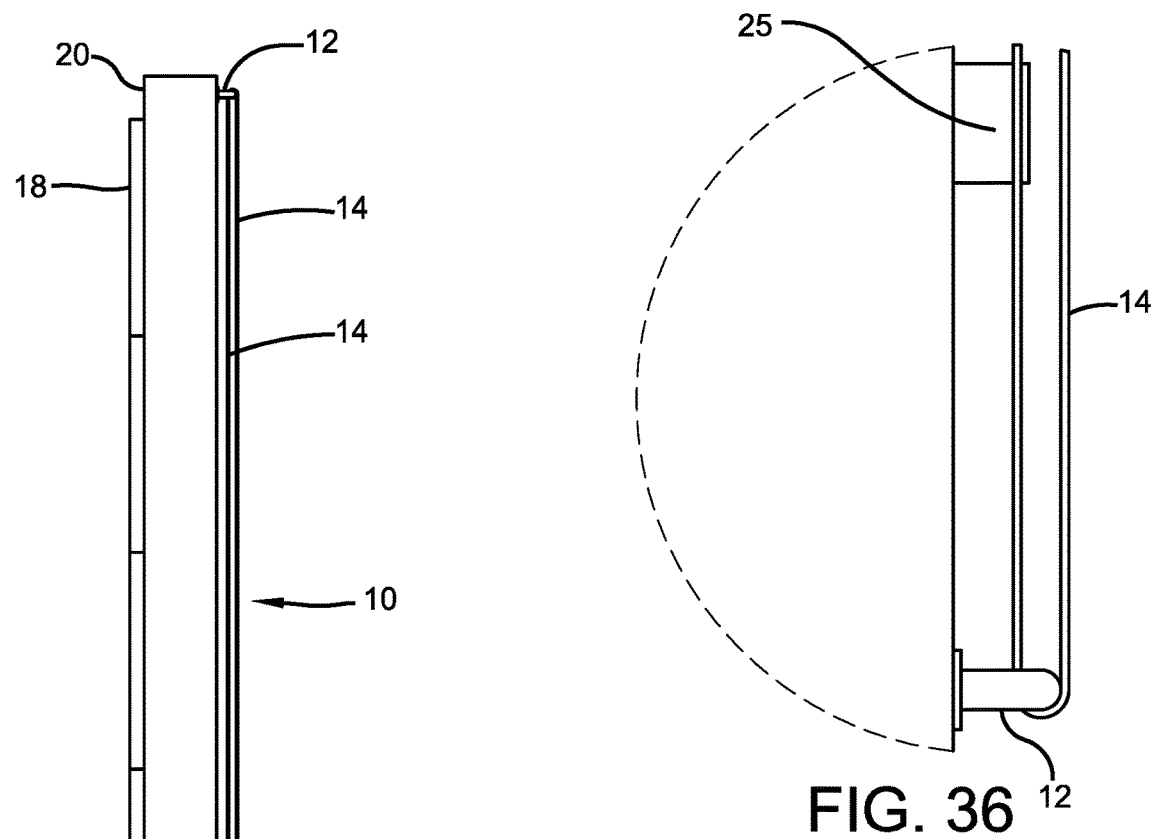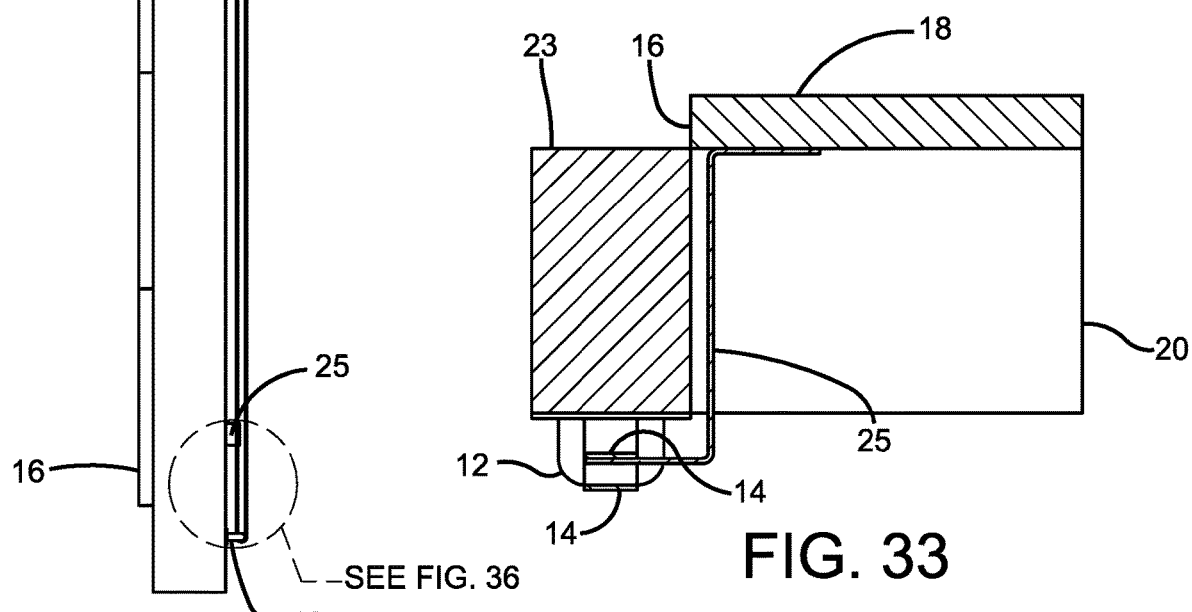

OVERHEAD TRUCK DOOR OPENING AND CLOSING MECHANISM

CROSS REFERENCE TO RELATED APPLICATIONS

This application is a continuation application claiming priority to U.S. patent application Ser. No. 15/695,806 filed Sep. 5, 2017, which issued as U.S. Pat. No. 10,280,672 May 7, 2019, which claims the benefit of U.S. Provisional Patent Application Ser. No. 62/384,020 filed Sep. 6, 2016, and which is also a continuation-in-part of U.S. Pat. No. 10,076,951 dated Sep. 18, 2018, which claims the benefit of U.S. Provisional Patent Application No. 62/109,092 filed Jan. 29, 2015. The disclosures of each document is incorporated herein by reference.

BACKGROUND OF THE DISCLOSURE

1. Technical Field

The present disclosure generally relates to opening and closing mechanisms for overhead doors such as those used with box truck cargo holds or enclosed semi-trailers. More particularly, the present disclosure relates to opening and closing mechanisms for overhead doors that allow the user to open and close the overhead door while standing on the ground instead of climbing up on the truck.

2. Background Information

Cargo trucks that have overhead pull down doors are typically opened by the user of the truck when the user unlatches the door from the truck bed and initially pushes it upwardly while the user is standing on the ground. The doors are typically taller than a user's reach and the doors typically do not glide all the way up to their fully open position. When this occurs, the user must climb up onto the rear bumper of the truck or up into the cargo space to push the door to its fully open position. When the door is to be closed, the user almost always has to climb onto the rear bumper of the truck or into the cargo area in order to reach the door to pull it down to its closed position. Although some doors have short hanging straps for the purpose of pulling them closed, most people have to climb onto the truck bumper to reach the strap. The process of climbing onto the bumper and jumping down from the bumper leads to injuries. The process of pulling down a door while the user stands on the bumper also leads to injuries. This is particularly risky during inclement weather especially when the bumper is wet, snow-covered, or icy. Delivery personnel who open and close truck doors multiple times per day desire a more convenient and safe or mechanism for opening and closing the truck door.

SUMMARY OF THE DISCLOSURE

The mechanism configurations described in the following detailed description are intended to decrease injuries to the people who load and unload items from box trucks and semi-trailers. The mechanism allows the user to open and close an overhead roll-up door of these trucks while standing firmly and safely on the ground at the rear corner of the truck.

The disclosure provides a door opening and closing mechanism in the form of a loop of material that is attached to a lower portion of the roll-up door and a guide disposed near the top of the door frame. The loop is disposed on the outside of the door. A user can pull on one portion of the loop to open the door and on another portion of the loop to close the door. The user can reach both of these portions while standing firmly and safely on the ground. The disclosure also provides a roll-up overhead door in combination with the opening and closing mechanism.

The disclosure provides a configuration wherein the loop is disposed out of the door opening so there is no potential interference of the loop with the people and/or loaders moving into and out of the door opening. In one configuration, the loop is disposed along one of the vertical frame members that define the door opening.

The disclosure provides configurations wherein the loop includes an indicator that shows the user which side of the loop is to be pulled down depending on the position of the door.

The disclosure provides configurations for the loop with different grips.

The disclosure provides different guide configurations carried by mounting brackets that can be secured to truck frames to allow the opening and closing mechanism to be retrofit onto existing truck frames.

The disclosure provides a motorized door opening and closing apparatus wherein an electric motor is used to selectively open and close the door. The apparatus includes a flexible loop attached to a lower portion of the door. An upper portion of the loop is driven by the motor to open and close the door. A toothed belt can be used to define the flexible loop.

The mechanism described in this disclosure also can be used on an elevated overhead door on a building where in the user must climb up onto a structure to open and close it. Such a location can be an elevated loading dock.

The preceding non-limiting aspects, as well as others, are more particularly described below. A more complete understanding of the processes and equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 17 is a side view of an alternative configuration for the loop material.

FIG. 21 is an elevation view of an alternative configuration wherein a motor is used to provide the opening and closing force to the apparatus.

FIG. 31 is an elevation view of a truck with an overhead door with an opening and closing mechanism disposed out of the door opening.

FIG. 32 is a side view of the truck door and vertical frame member with the opening and closing member depicted without the sidewalls, floor, or roof of the cargo hold.

FIG. 33 is a section view taken along line 33-33 of FIG. 31.

FIG. 36 is an enlarged elevation view of the encircled portion of FIG. 32.

Similar numbers refer to similar elements throughout the specification.

DETAILED DESCRIPTION OF THE DISCLOSURE

Figure 1:
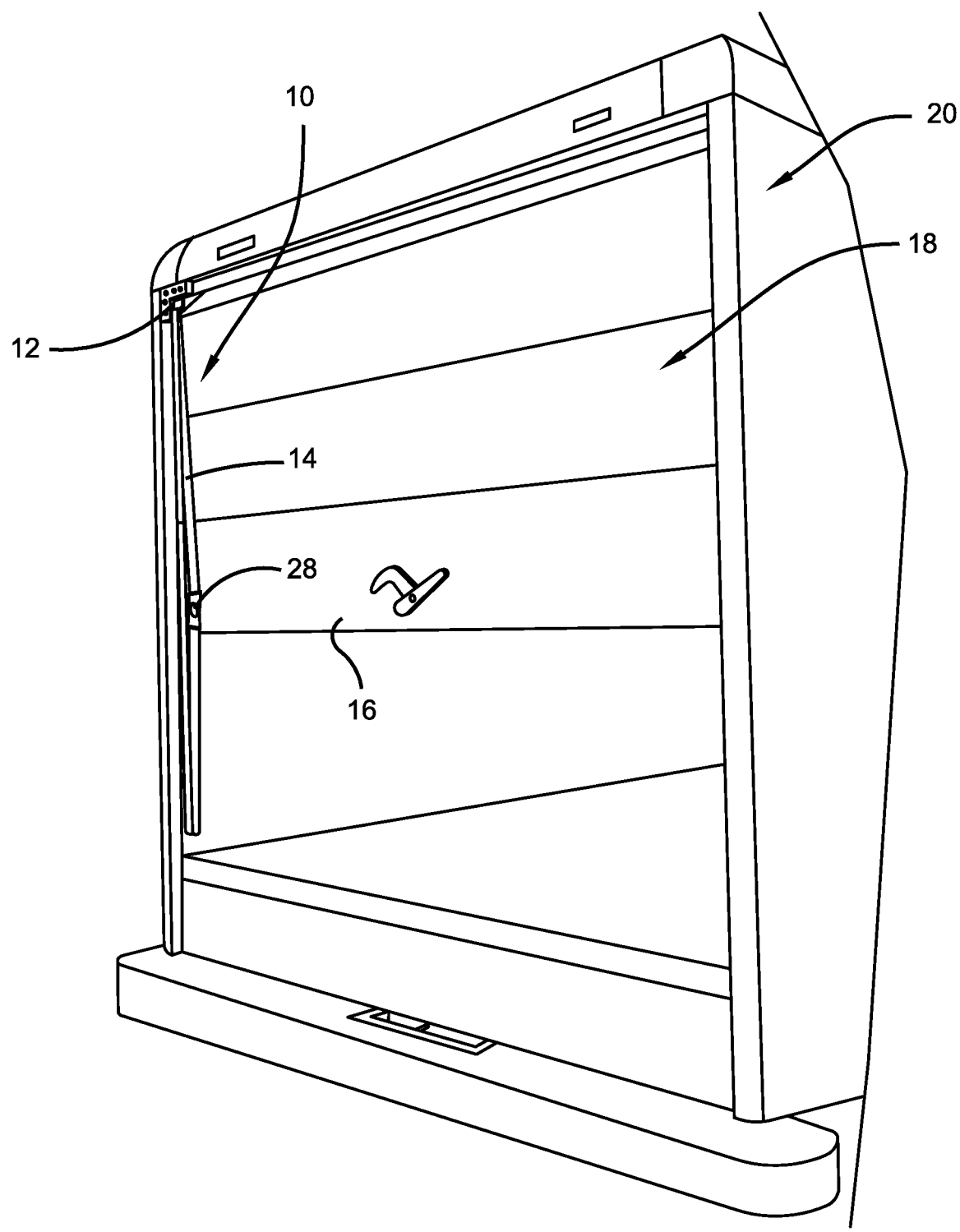
FIG. 1 depicts a rear view of a truck with an overhead door partially open with a first exemplary configuration of the opening and closing mechanism of this disclosure being depicted on the left-hand side of the door.

The different embodiments of the opening and closing mechanism of this disclosure is generally indicated by the reference number 10 in the accompanying drawings. Opening and closing mechanism 10 allows an overhead cargo door 18 of the truck 20 to be opened and closed while a person is standing firmly on the ground at the back rear corner of truck 20. Mechanism 10 generally includes a flexible loop 14 that is connected to a lower portion 16 of door 18 and is supported from above by a guide 12 that allows loop 14 to be moved between first and second positions through guide 12. Loop 14 is disposed on the exterior of door 18. Mechanism 10 allows the user to open door 18 by pulling down one portion of loop 14 and then to close door 18 by pulling down on another portion of loop 14. Both the opening and the closing of door 18 are achieved by pulling down on portions of loop 14. Opening and closing mechanism 10 may be built into new trucks or it can be retrofit to existing trucks 20.

A first exemplary configuration of an opening and closing mechanism of this disclosure is generally shown on the left side of FIG. 1 and shown in more detail in FIGS. 2-6. Mechanism 10 generally includes an upper guide 12 and a flexible loop 14 that extends between guide 12 and a lower portion 16 of the truck door 18. Loop 14 can be continuous or broken by a connector, a buckle, or with a portion of loop 14 being formed by a portion of door 18. The ends of loop 14 can be connected to door 18 at the same location or different locations. Mechanism 10 is used with overhead roll-up truck doors that typically have a plurality of hinged panels that ride on tracks disposed at the sides of the trailer opening and project inwardly from the top of the opening. Loop 14 is attached to the lowermost hinged panel with an anchor 28.

Figure 20:
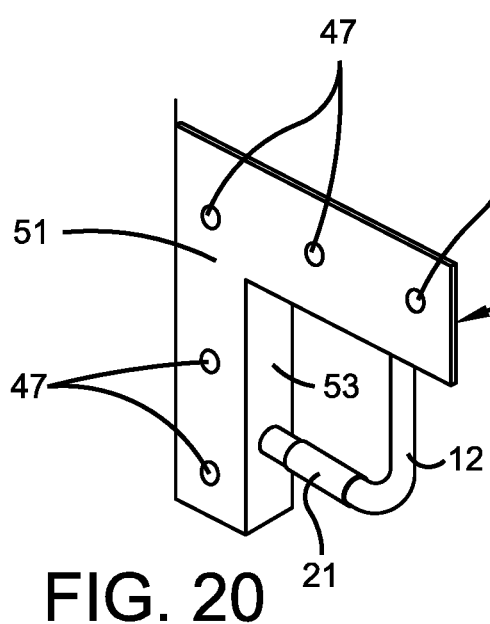
FIG. 20 is a view similar to FIG. 2 depicting an alternative guide that has a roller.
Figure 4:
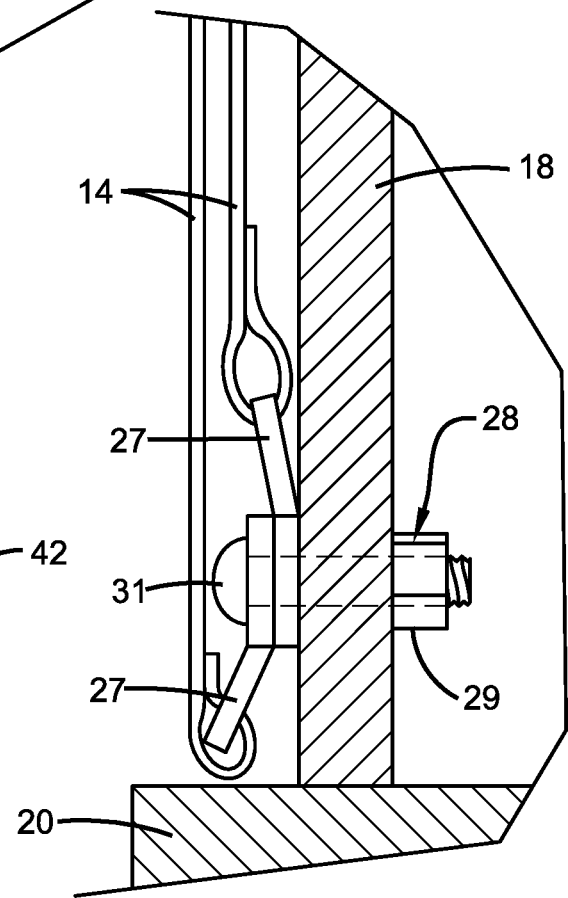
FIG. 4 is a section view taken through the door showing a side view of the connection between the loop and the door.

In the exemplary configuration of FIGS. 1-6, guide 12 is provided in the form of a thin bar having a rounded cross section. Loop 14 slides directly over the rounded profile of guide 12. The thin bar that defines guide 12 can be mounted directly to the frame members of truck 20 or, alternatively, to a mounting bracket 42 that is used to connect guide 12 to truck 20. In an alternative configuration of FIG. 20, the horizontal bar of guide 12 includes a roller 21 that freely rotates with respect to the other portions of guide 12 so that loop 14 more easily moves between its first and second positions.

Figure 19:
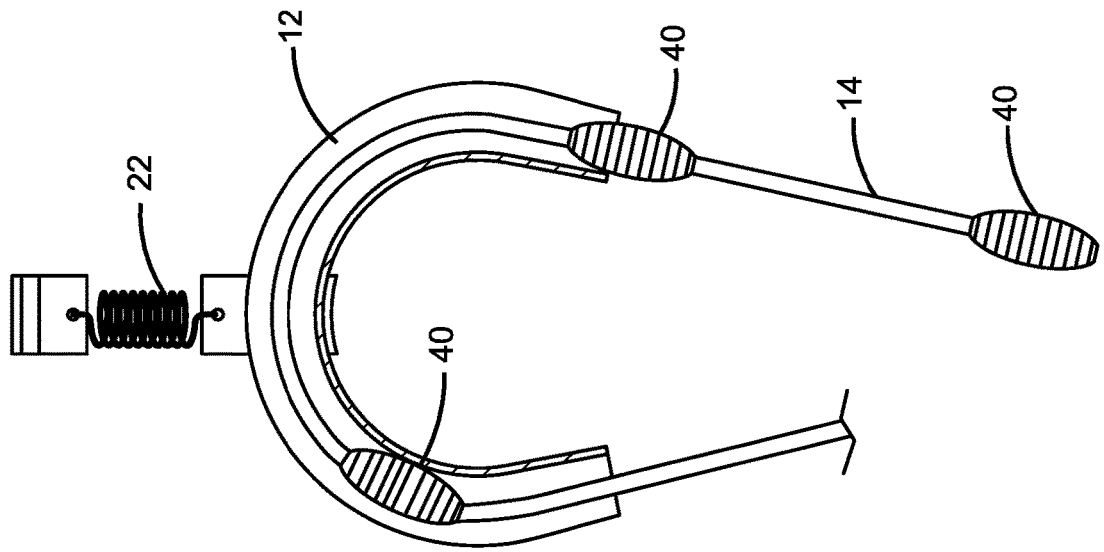
FIG. 19 depicts a spring-biased version of the FIG. 18 configuration.

As shown in FIGS. 2, 5, 6, 7, 8, 12, 13, 18, 19, and 25 guide 12 can be provided in the form of a pulley, a roller, a passive guide, a slide, or an eye-bolt. Each of these guides 12 can be secured to the truck 20 with a rigid connection or a biased connection such as depicted in FIG. 19. The biased connection includes a spring 22.

Figure 2:
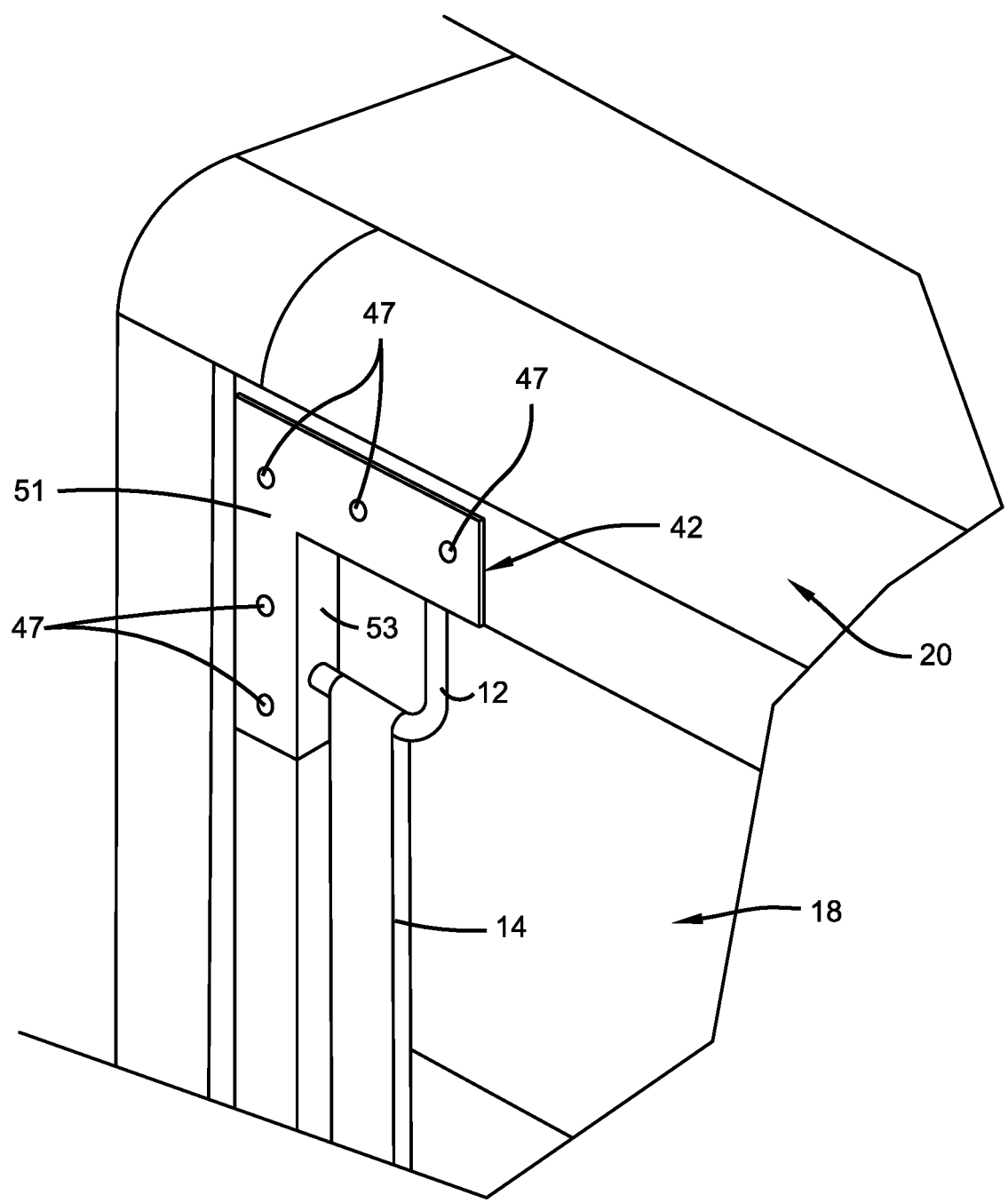
FIG. 2 is an enlarged perspective view of the upper left hand corner of the door frame showing an exemplary configuration for the guide used with the opening and closing mechanism.
Figure 3:
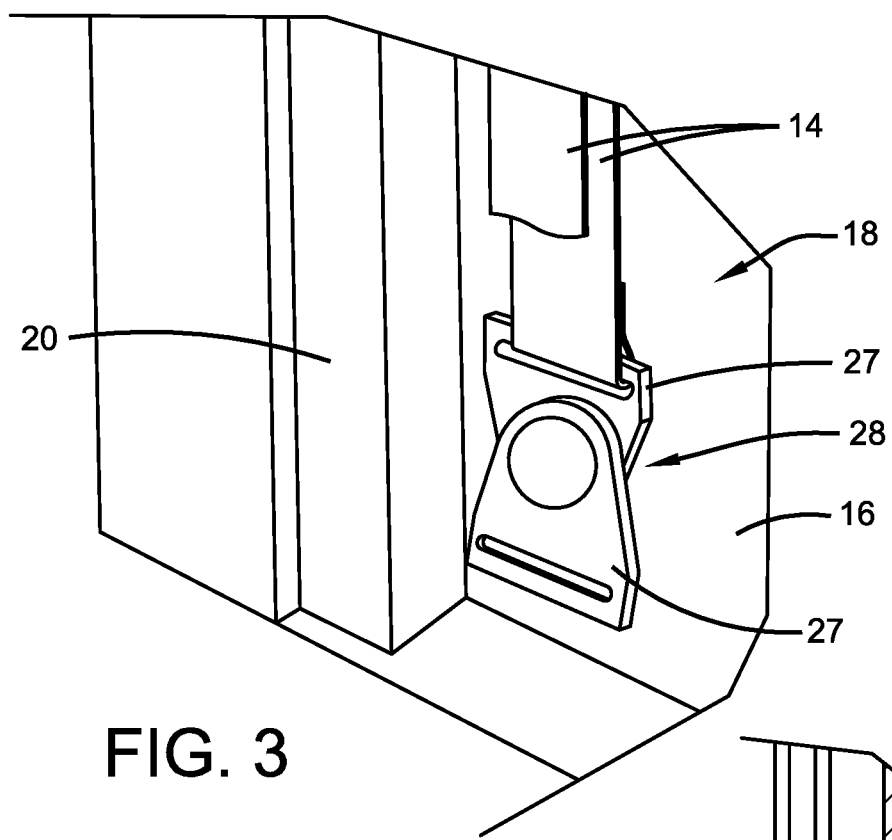
FIG. 3 is a perspective view of the lower left hand corner of the door frame with the door in a closed configuration with a portion of the loop broken away to show the connection of the loop with the door.
Figure 5:
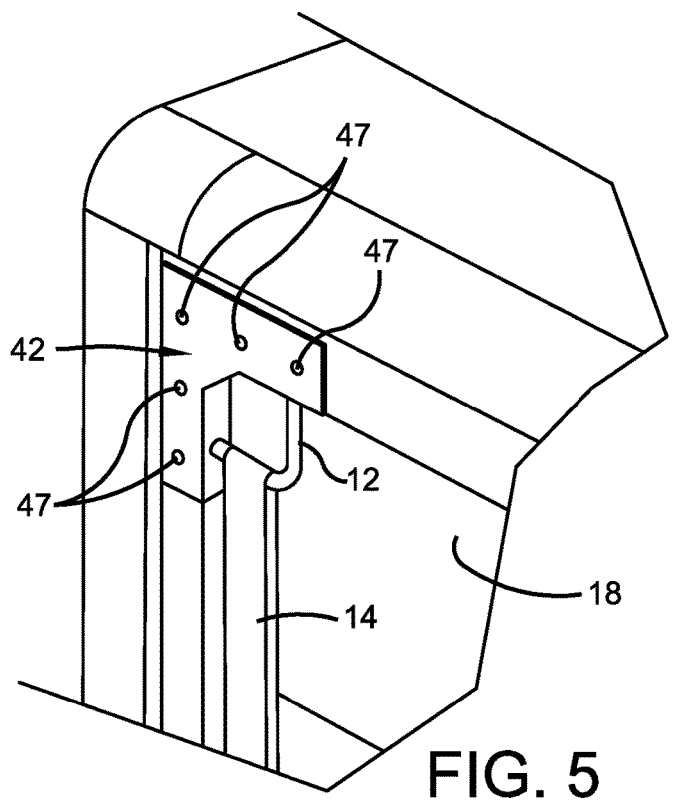
FIG. 5 is an enlarged perspective view of the upper left hand corner of the door frame showing another exemplary configuration for the guide used with the opening and closing mechanism.
Figure 6:
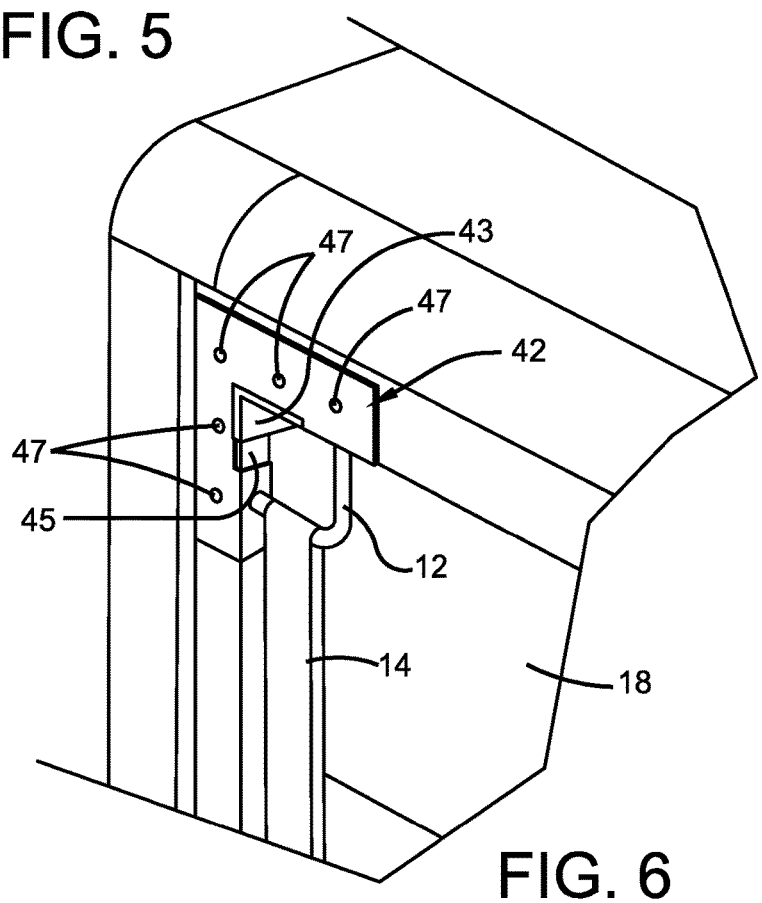
FIG. 6 is an enlarged perspective view of the upper left hand corner of the door frame showing another exemplary configuration for the guide used with the opening and closing mechanism.
Figure 7:
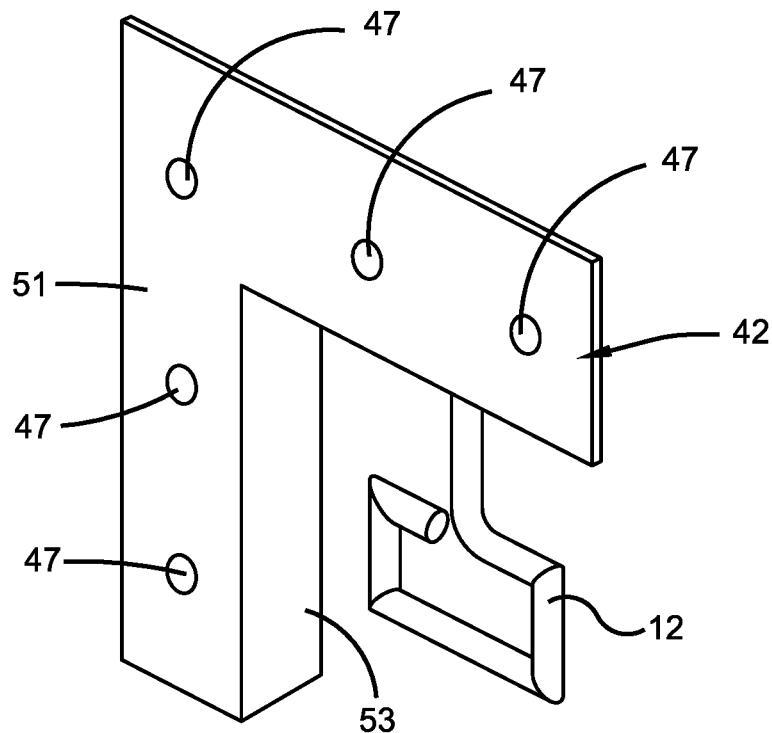
FIG. 7 is a perspective view of an exemplary guide and mounting bracket for the mechanism that allows the mechanism to be retrofit onto existing truck frames.
Figure 8:
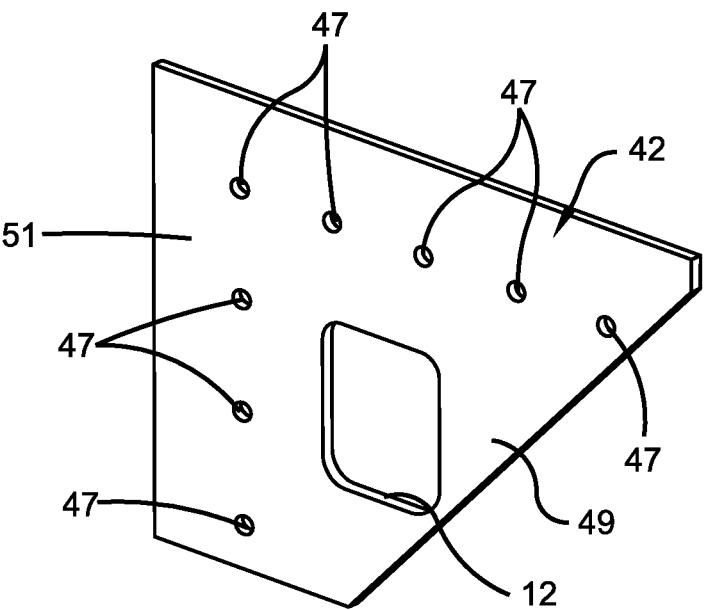
FIG. 8 is a perspective view of an exemplary guide and mounting bracket for the mechanism that allows the mechanism to be retrofit onto existing truck frames.

Mounting bracket 42 is provided with closed right angle inner corner as shown in FIG. 2. An alternative mounting bracket 42 is depicted in FIG. 5 with an angled inner corner to accommodate an angled reinforcement plate 43 disposed at the corner of the truck frame. Another alternate mounting bracket 42 has an opening 45 that allows the angled reinforcement plate 43 to extend through mounting bracket 42. Mounting bracket 42 defines a plurality of openings 47 that allow mounting bracket 42 to be secured to truck 20 with fasteners such as metal screws, bolts, or rivets. Mounting bracket 42 also can be welded to truck 20. FIG. 8 depicts a configuration of mounting bracket 42 with an integral angled reinforcement plate 49 that strengthens the corner of the truck frame. In the FIG. 8 configuration, guide 12 is an opening defined by the body of mounting bracket 42.

Mounting bracket 42 can include an L-shaped front face 51 that defines fastener openings 47. Mounting bracket 42 also includes sidewalls 53 to which guide 12 is connected. Sidewalls 53 are generally perpendicular to front face 51 and generally perpendicular to each other. Mounting bracket 42 can be added to the corner of an existing truck door frame that defines the door opening of a truck. Mounting bracket 42 thus provides a convenient method to retrofit an existing truck door frame with mechanism 10. Once mounting bracket 42 is connected at the corner of the door frame, guide 12 is positioned near the edge of door 18 and loop 14 can be positioned through guide 12 and secured to door 18.

Figure 9:
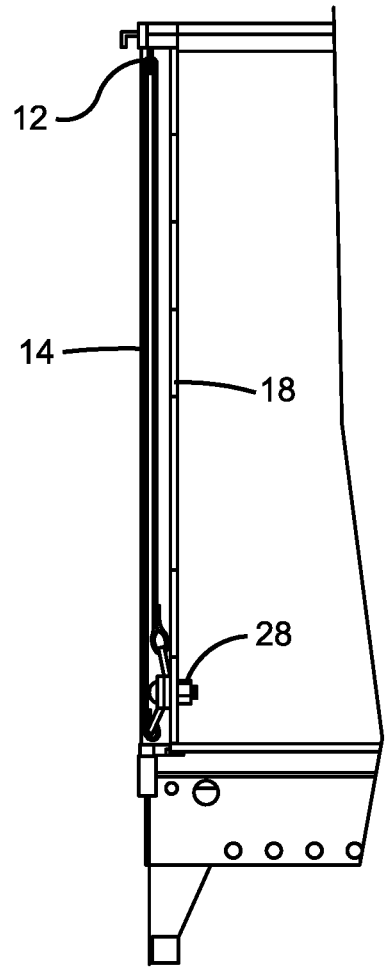
FIG. 9 is a side view of the overhead door and mechanism of FIG. 1 in the closed condition.
Figure 10:
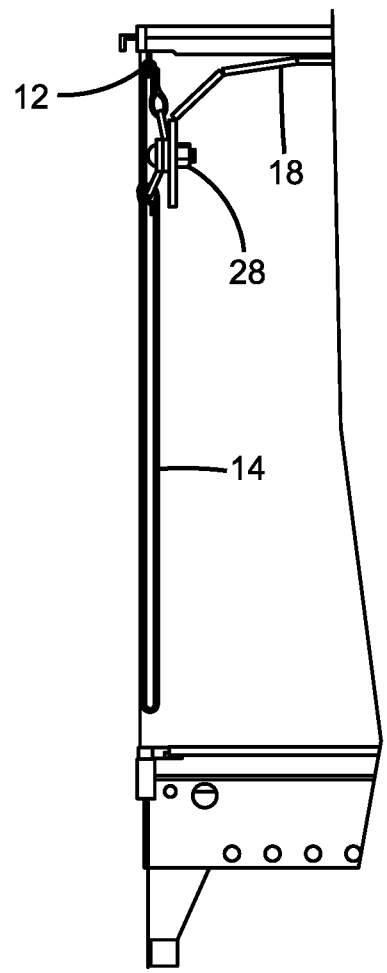
FIG. 10 is a side view of the overhead door and mechanism of FIG. 1 in the open configuration.
Figure 11:
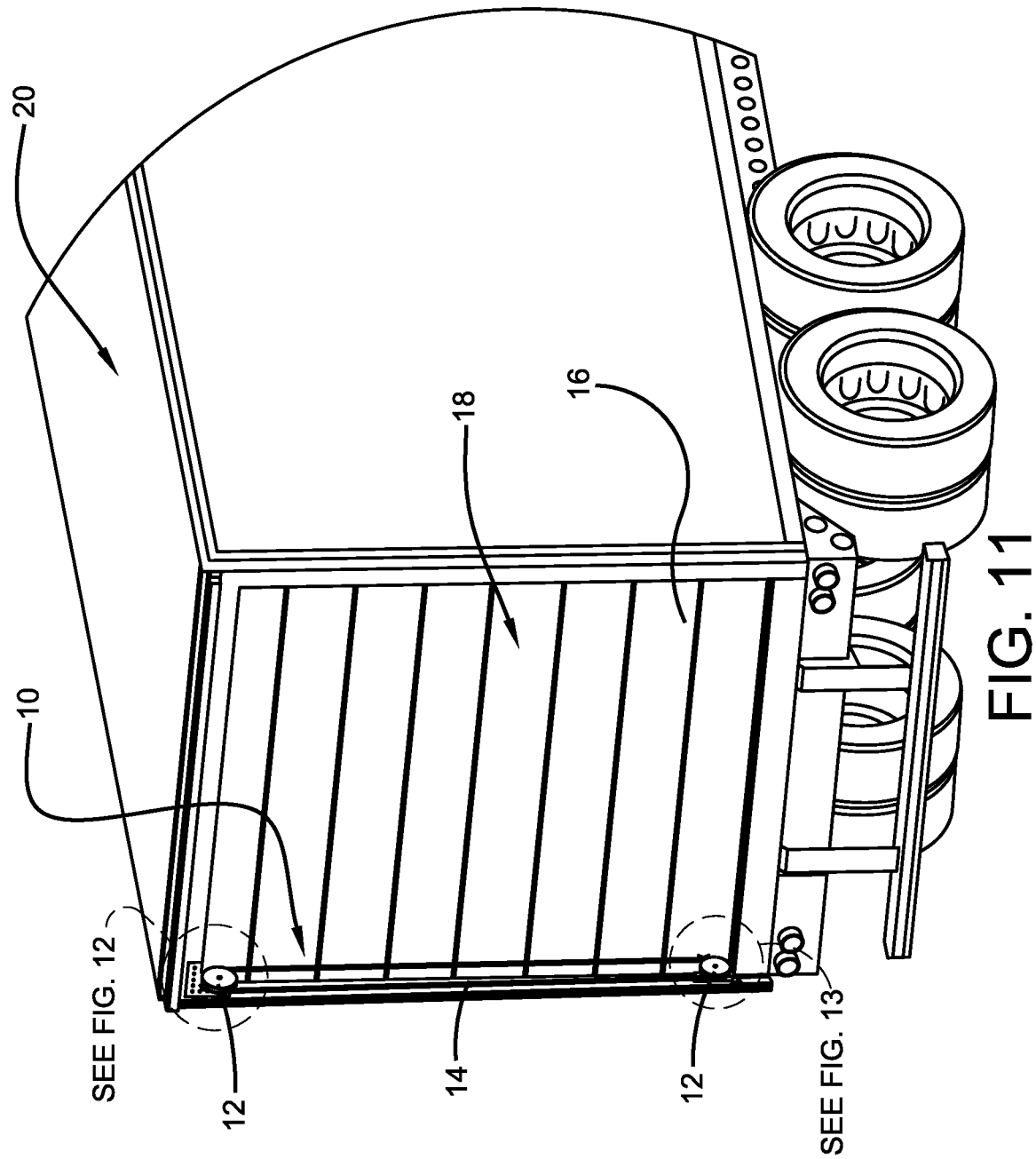
FIG. 11 depicts a rear view of a truck with an overhead door in the closed configuration with another exemplary configuration of the opening and closing mechanism of this disclosure being depicted on the left-hand side of the drawing.
Figure 12:
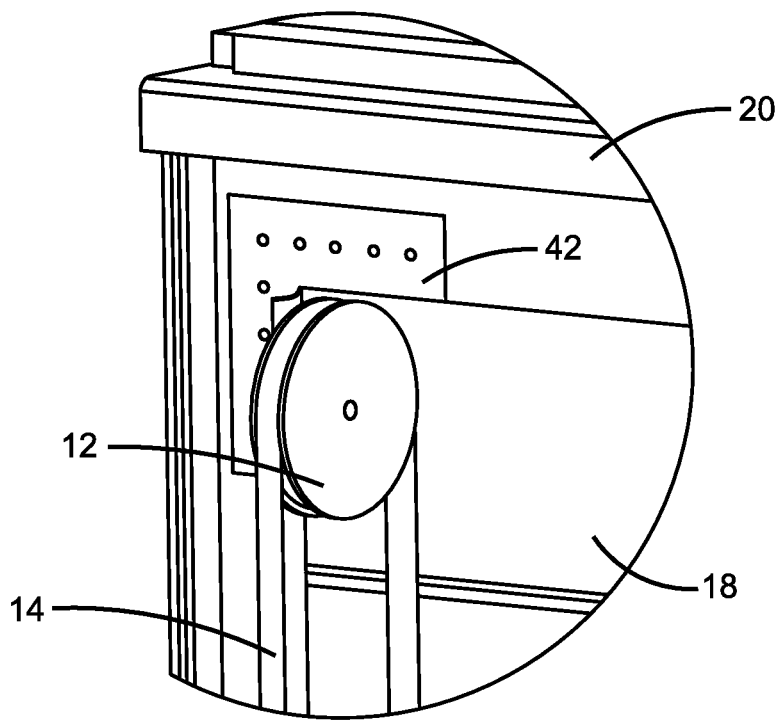
FIG. 12 is an enlarged view of the top of the mechanism depicted in FIG. 11.
Figure 13:
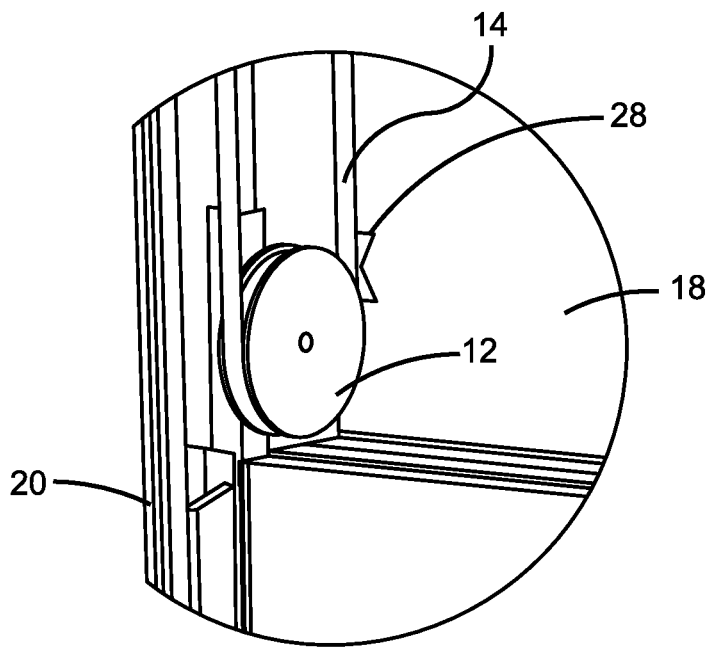
FIG. 13 is an enlarged view of the bottom of the mechanism depicted in FIG. 11.
Figure 15:
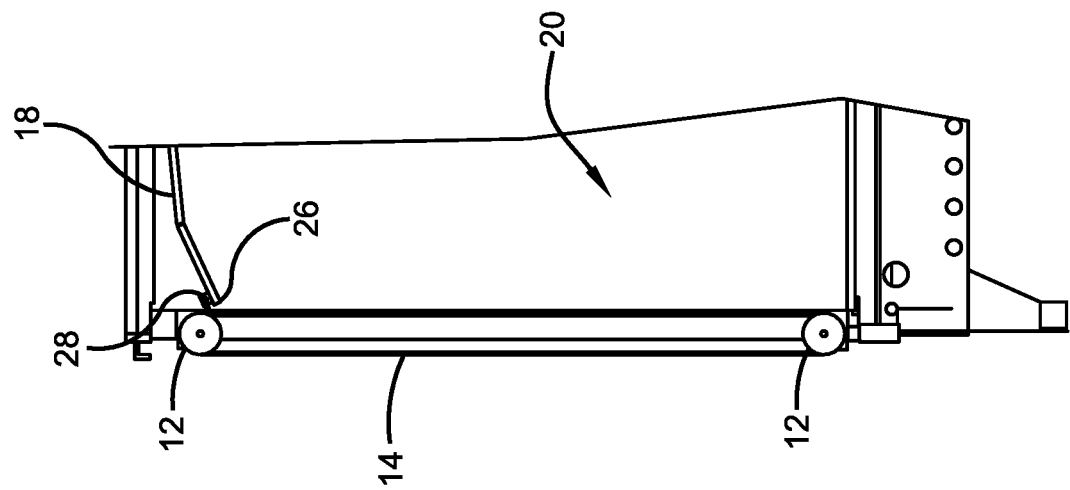
FIG. 15 is a side view of the overhead door and mechanism of FIG. 11 in the open configuration.
Figure 14:
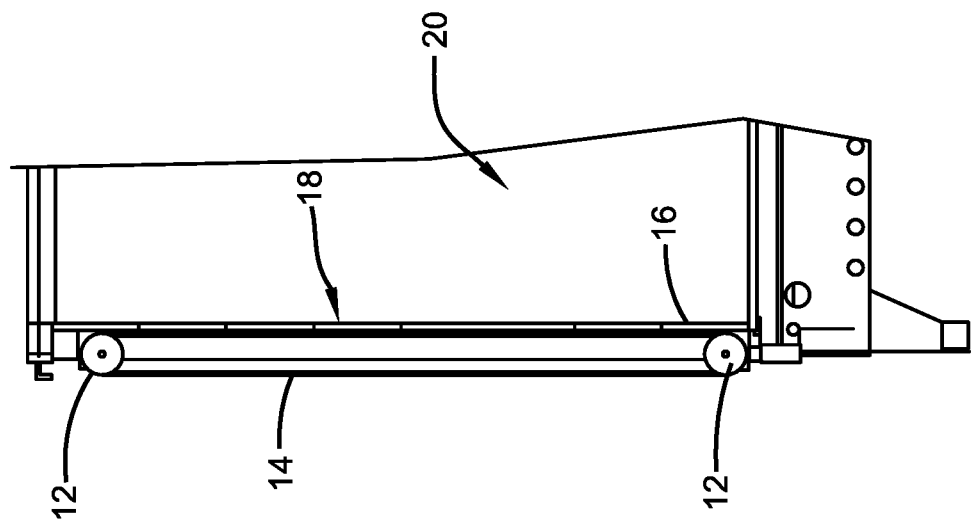
FIG. 14 is a side view of the overhead door and mechanism of FIG. 11 in the closed condition.
Figure 16:
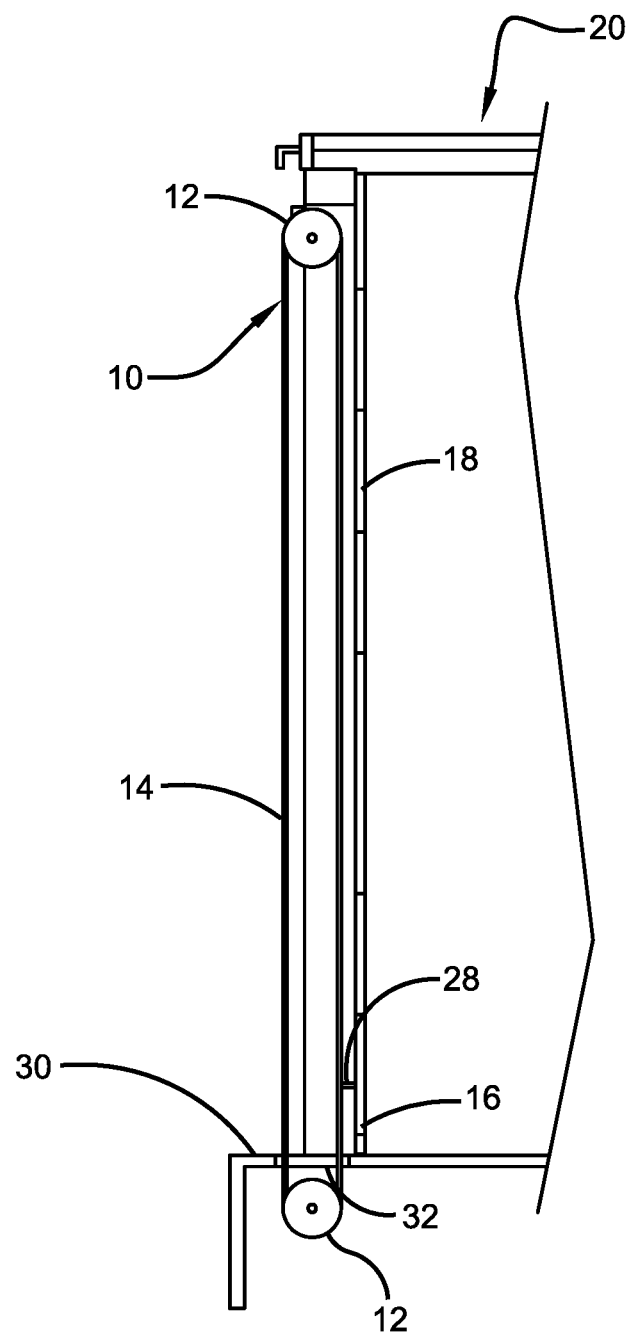
FIG. 16 is a view similar to FIG. 14 showing a configuration wherein the lower pulley is disposed under the truck bed.

FIG. 9 shows the closed position of door 18 and the first position of loop 14. In this position, loop 14 is disposed between guide 12 and door 18 and can be taut to minimize flapping in the wind while the truck is moving. FIG. 10 depicts the open position of door 18 and the second position of loop 14. As shown in FIG. 10, the upper guide 12 is positioned above the upper location of the lower end 26 of door 18 when door 18 is fully open. This allows loop 14 to be secured to the lower portion 16 of door 18. When door 18 is raised to the open position, the location of the anchor 28 that secures loop 14 to door 18 stops just below upper guide 12. This configuration allows the remainder of loop 14 to hang loosely.

One configuration of anchor 28 includes a pair of brackets 27 that each define a slot to receive an end of loop 14 and a bolt hole. Brackets 27 are bolted to door 18 with a single nut 29 and bolt 31 combination. The nut can be disposed on the inside of door 18. As an alternative, anchor 28 can be a clamp that secures a portion of loop 14 to door 18. In one configuration, loop 14 can be fitted through one or more openings defined by door 18.

Figure 23:
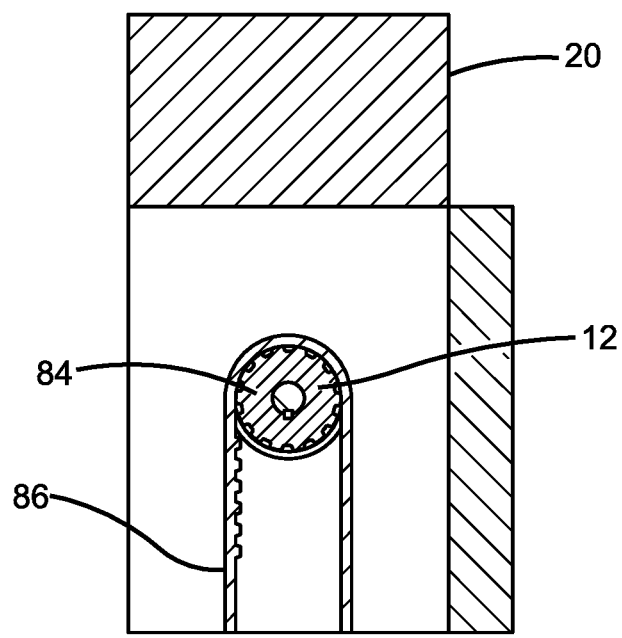
FIG. 23 is a section view taken along line 23-23 of FIG. 22.
Figure 24:
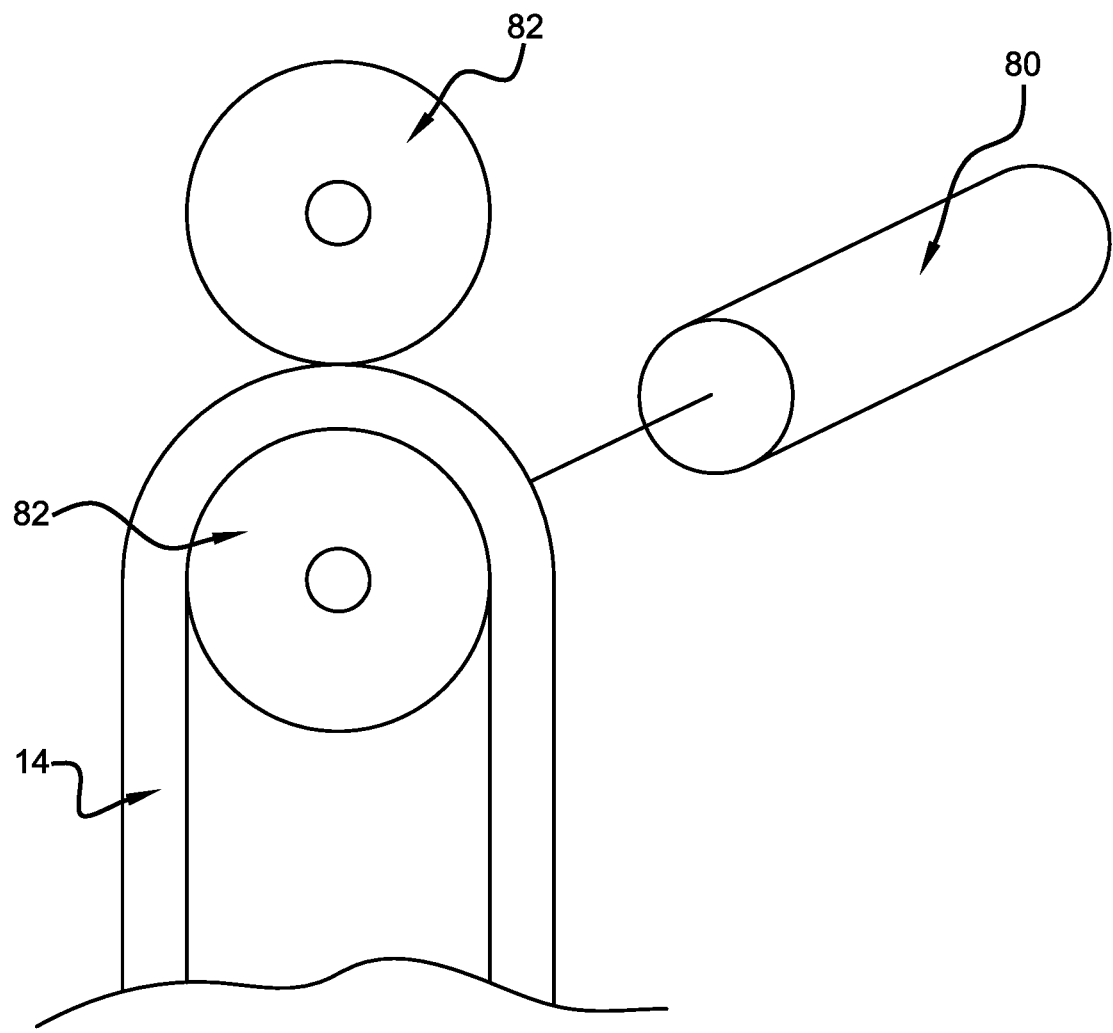
FIG. 24 is a view similar to FIG. 23 depicting an alternative motor and drive for the loop.
Figure 25:
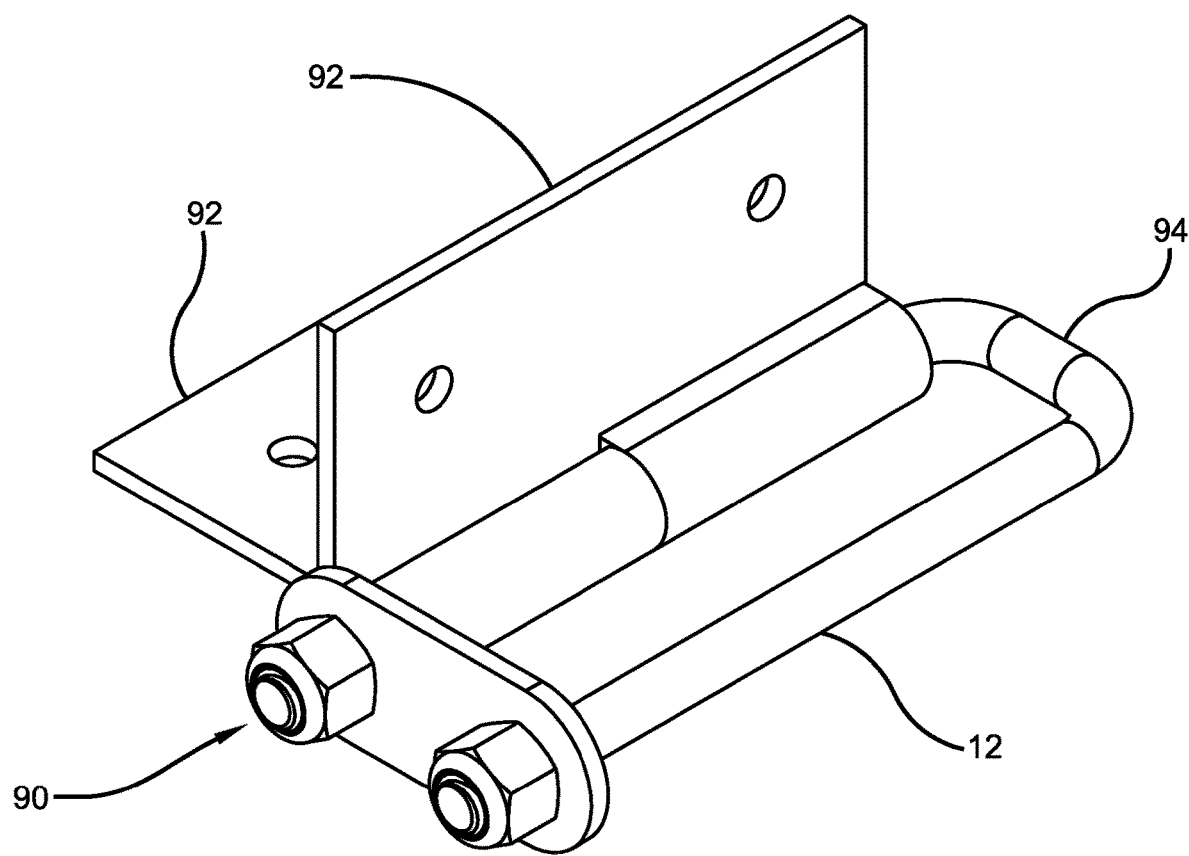
FIG. 25 depicts a perspective view of an alternate mount for the loop.
Figure 26:
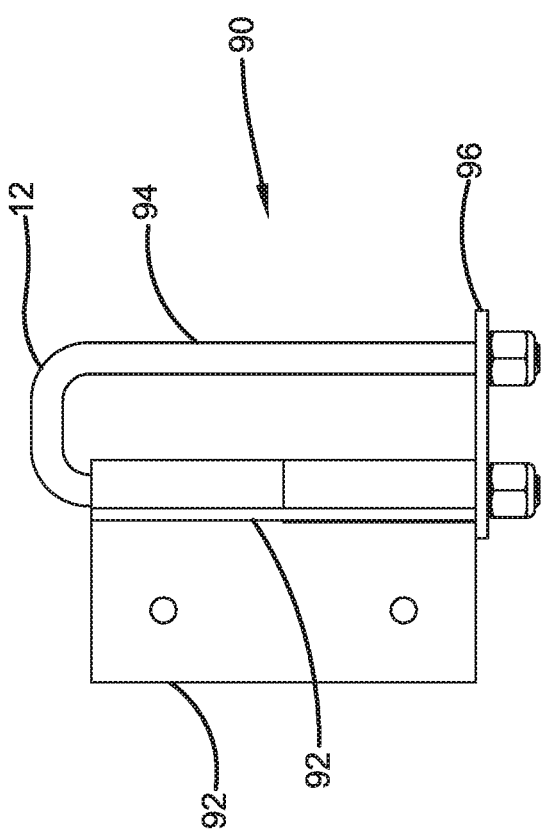
FIG. 26 is a top view of the mount of FIG. 25.
Figure 30:
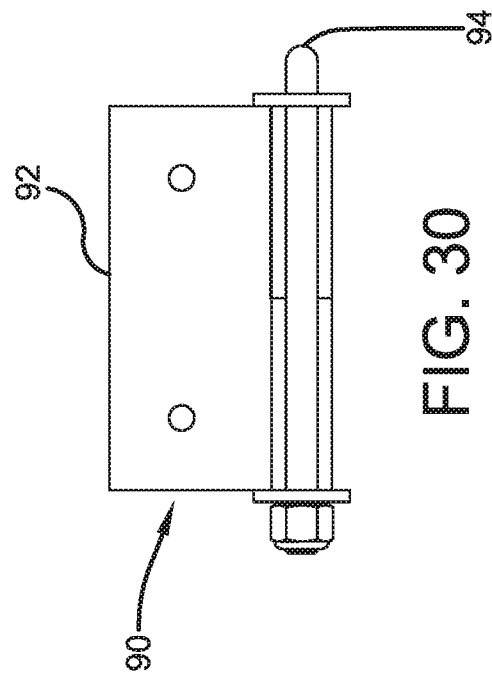
FIG. 30 is a front elevation view of the mount of FIG. 25.
Figure 27:
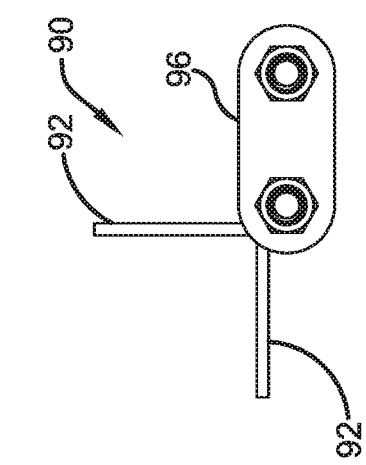
FIG. 27 is an end view of the mount of FIG. 25.
Figure 29:
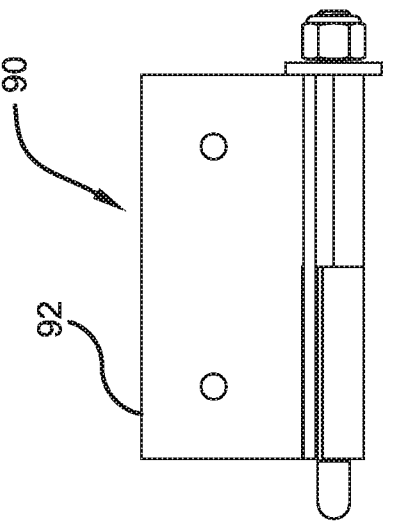
FIG. 29 is a rear elevation view of the mount of FIG. 25.
Figure 28:
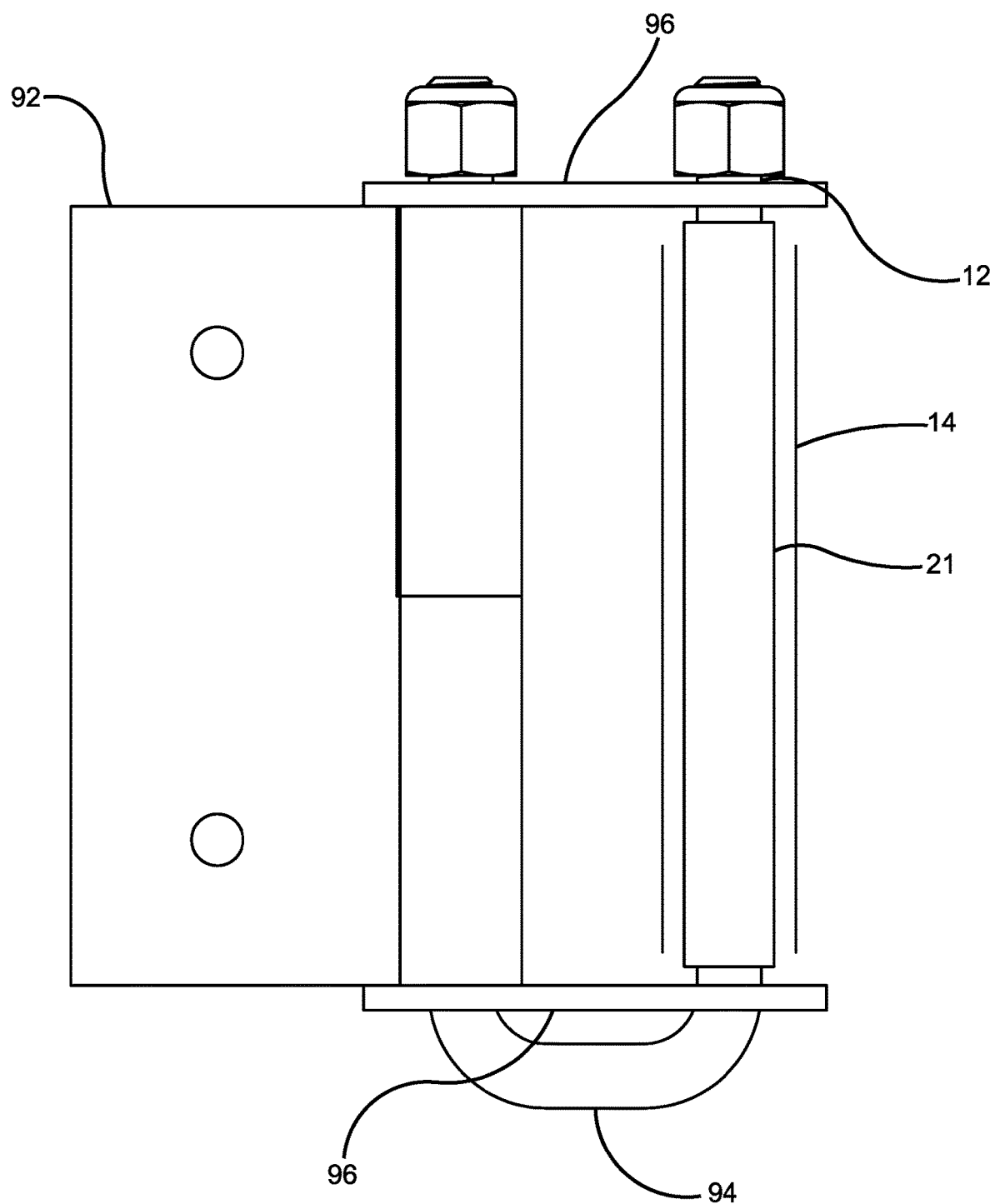
FIG. 28 is a bottom view of the mount of FIG. 25 showing an alternative sleeve with the loop depicted schematically.
Figure 34:
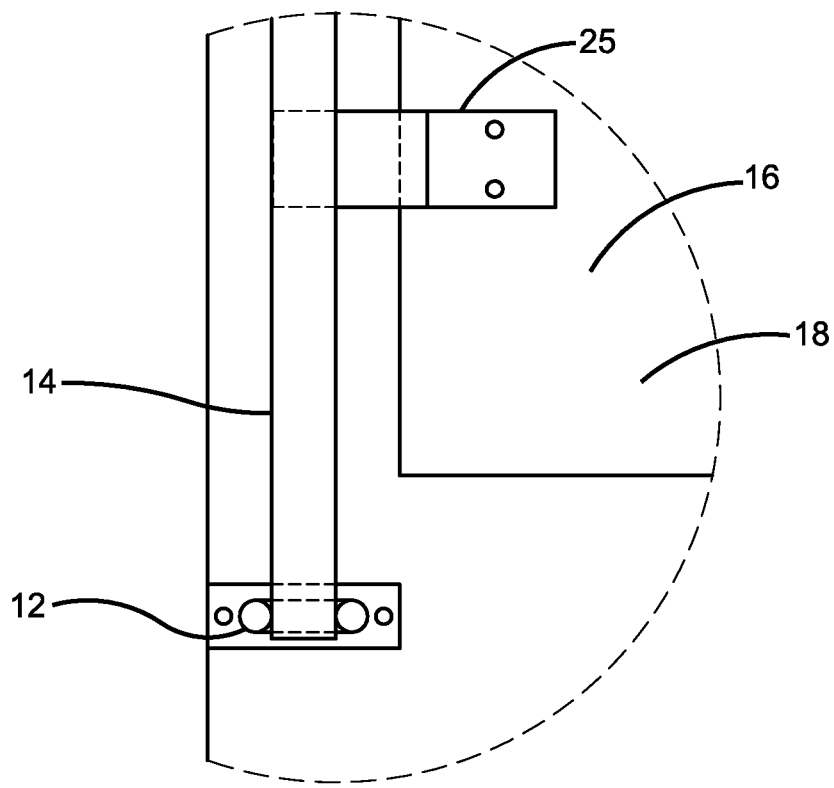
FIG. 34 is an enlarged elevation view of the lower encircled portion of FIG. 31.
Figure 35:
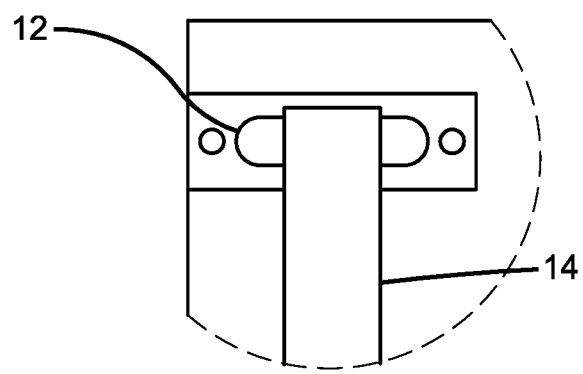
FIG. 35 is an enlarged elevation view of the upper encircled portion of FIG. 31.

In the exemplary configuration of FIGS. 11-16, a lower guide 12 is used at the bottom of the truck frame to hold the position of loop 14 when door 18 is open. The lower guide 12 can be in the form of any guide 12 described above. In this configuration, guides 12 are in the form of pulleys. In the FIG. 16 configuration, the lower guide 12 is positioned under the floor. When the lower guide 12 is installed below floor 30, a single opening 32 or a plurality of openings 32 are defined by floor 30 to receive loop 14. In these configurations and the configurations of FIGS. 21-24, a motor 80 can be used to move loop 4. Motor 80 can be located near the upper guide, the lower guide, above the truck bed or below the truck bed. A housing can be used to protect motor 80 from the weather. Motor 80 can drive pinch rollers 82 that drives a flat strap loop 14 or a toothed roller 84 that drives a toothed strap (see reference numeral 86 in FIG. 23) loop 14. This loop 14 can be made from a chain, a cable with knobs, or a toothed belt. A limit switch can be used to turn off the motor with a sensor carried by the loop or the door. As this sensor passes the limit switch, a signal is sent to the motor that turns the motor off. The motor can be controlled with manual switches, automated switches, or a remote control that uses RF signals, Bluetooth, or other wireless communications protocols. Motor 80 can be powered by its own power source or the power source carried by the truck. In other configurations, motor 80 can be used without the lower guide. In these configurations, a stiff or loop of stiff links is used to push the door down by motor 80. In another configuration, motor 80 rotates or gear or roller that directly engages the door to move it up and down.

FIG. 21 depicts an optional extension 88 connected to loop 14 that hangs down to help a user pull the door closed at the end of the closing process. This can be useful when the user's hand is close to anchor 28. Instead of being pinched between the sides of loop 14, the user can grasp extension 88 and finish the closing process. When not in use, extension 88 can be secured by a magnet 90 (either carried by extension 88 or with a magnet carried by truck and a ferrous metal carried by extension 88) or a section of hook and loop material (such as Velcro®) that holds extension 88 to another portion of loop 14 or the truck. Extension 88 can be one foot or up to four feet long. Extension 88 can be made from the same material as loop 14 or a material comfortable to grasp. Extension 88 can be used with the manual loop or the motorized loop.

In the configuration of FIGS. 1-10, only the upper guide 12 is used with loop 14 hanging loose when door 18 is open. This configuration does not require the lower guide and does not present any risk of a tripping or unloading hazard in the lower corner of the door opening. When door 18 is open, the loosely hanging loop 14 can be pulled out of the way and secured in a position that is out of the user's way until it is need to close door 18.

Loop 14 can be formed from a strapping material. In one configuration, the strap material is one to three inches wide and one-sixteenth to a half inch thick. The strap material can be 1.500 inches wide and 0.125 inches thick or 2.000 inches wide and 0.125 inches thick. Loop 14 can be a solid material such as a solid polymer or fiber strap or a woven material. A woven polymer such as woven polypropylene, woven polyester, or woven Nylon can be used. The strapping material can be folded and doubled over itself when grasped by the user so that the user can obtain a good grip on loop 14 to pull down. In other configurations, loop 14 is formed from an endless or spliced belt, a cable, a chain, a rope, or a wire. A stainless steel cable can be used.

In any of these configurations, the portion of loop 14 that is pulled down to move door 18 is provided with an indicator to identify that portion of loop 14 to the user. The indicator can be a color, a change in size of loop 14, a change in material, or a plurality of lugs 40 formed or added to the portion of loop 14 that I to be pulled. In one example, loop 14 defines an outer portion and an inner portion when the door is closed as depicted in FIG. 9 with the outer portion being disposed to the left of the inner portion in the drawing. Each of the outer and inner portions has an outward-facing surface and a door-facing surface. In this configuration, the user must grasp and pull down on the outer portion of loop to open door 18. As such, the outward-facing surface of outer portion of loop can include an indicator that informs the user that it is the correct portion of loop 14 to be pulled to open door 18. When the user opens the door as shown in FIG. 10, the surface of the outer portion that was door-facing has rotated around to be the outerward-facing surface of the inner portion. This surface can also be provided with an indicator that tells the user that it is the portion of loop 14 that is pulled down to close door 18. The indicators can be arrows, a different color, or a logo or trademark.

Figure 18:
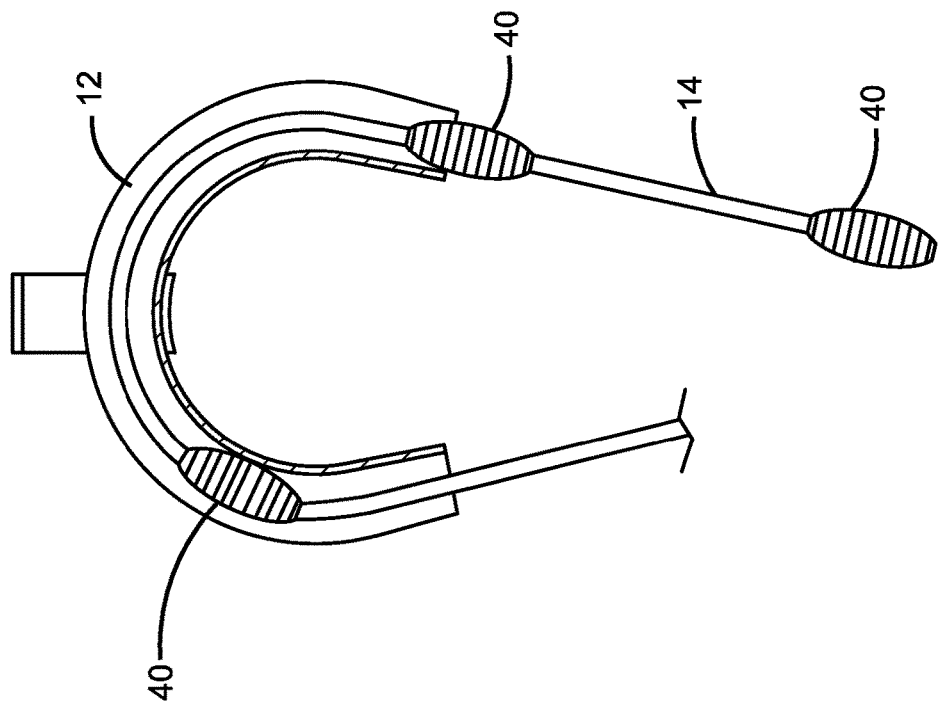
FIG. 18 depicts an alternative view of an upper guide used with the loop material of FIG. 17.
Figure 22:
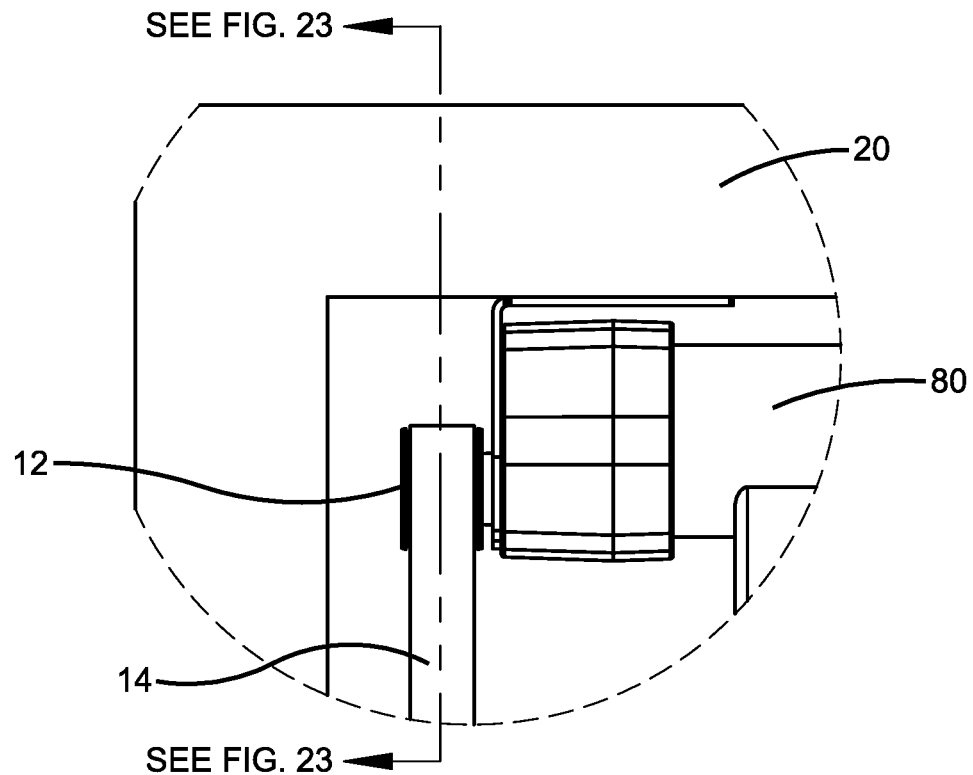
FIG. 22 is an enlarged elevation view of the motor and drive for the loop.

FIG. 17 depicts a configuration wherein a plurality of lugs 40 are disposed along half or about 40 percent of the length of loop 14. Lugs 40 can be actual lugs that are tied into the material of loop 14. In other configurations, lugs 40 are items connected to loop 14. For example, the items that form lugs 40 can be malleable metal slugs that are crimped onto or riveted into loop 14 or polymer slugs with locking teeth that are snap fit onto loop 14. In other configurations, lugs 40 can be secured to loop 14 with adhesive, welding, fusing, or friction. Lugs 40 are round or tapered on both ends to help them move through guides 12. When lugs 40 are provided on only a portion of loop 14, the user can use the lugs to identify which side of the loop to pull on to open or close the door. For example, in FIG. 9, lugs 40 would be added to the outer portion of loop 14 which is the half of loop 14 disposed farthest away from door 18. In this configuration the user grasps the lugs and pulls down to open the door. As door 18 is opened, the lugs are moved to the inner half of loop 14. In the configurations of mechanism 10 using lugs 40, guide 12 can be configured to allow lugs 40 to slide over or around guides 12. For example, FIGS. 18 and 19 depict exemplary guides 12 that are U-shaped in cross section and are sized to allow lugs 40 to slide through guides. When pulleys are used as guides 12, each pulley can use a U-shaped guide surface similar to FIGS. 18 and 19. Alternatively, a roller guide can define indents or notches that accommodate the movement of the lugs through the roller guide.

Loop 14 and/or guides 12 can be enclosed within a housing that surrounds guides and/or loop 14. Lower guide 12 can be readily removable and replaceable from truck 20 to allow a person unloading the truck to pull mechanism 10 out of the way if needed. A pinned connection between lower guide 12 and truck 20 can be used for this quick connection.

FIGS. 25-30 depict mounting brackets 90 that support guide 12. These brackets use one or two door hinge plates 92 and a U-bolt 94 to define guide 12 over which loop 14 moves. Side plates 96 can be used to support the legs of U-bolt 94 and can be used to contain a rotating sleeve 21 (shown for example in FIG. 28). Sleeve 21 can be nylon. One or both plates 92 can be mounted to the underside of the door frame or to the outer surface of the door frame to mount guide 21.

In FIGS. 31-36, loop 14 and one or more guides 12 are disposed in alignment with one of the vertical members 23 of the door frame. Loop 14 is disposed along the length of vertical frame member 23. As shown in FIG. 31, the majority of the length of loop 14 is disposed between the side edges of the vertical frame member 23. This configuration locates loop 14 laterally outwardly of the door opening when the door is open so that loop 14 does not interfere with workers or equipment entering or exiting the truck. Guide 12 can be disposed at the top of the truck frame or below the upper portion of the door where the lower edge of the door is located when the door is completely open. A single guide 12 can be used at the top of the frame or a pair of guides 12 can be used at the top and bottom of the frame. The pair of guides 12 prevents the loop from being loose when door 18 is open. These can be installed on either side of the door opening.

A bracket 25 is used to connect loop 14 to door 18. Bracket 25 can be a rigid member configured to match the offset between the door 18 and frame 23 as shown in FIG. 33. An offset bracket 25 with a pair of right angles can be used. This bracket 25 can be spaced from the door frame 23 or can slide against a portion of the frame. Bracket 25 also can be made from a flexible material such as a short section of the material used to form loop 14. Bracket 25 can be connected to the inner portion of loop 14 so that the user can pull down on the outer portion of the loop to open the door. When the door is open, the user can down on the inner portion of the loop or pull up on the outer portion of the loop to close the door.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A cargo truck comprising:
    an enclosed cargo hold with a door frame defined by spaced first and second vertical frame members and an upper cross frame member that is joined to the first and second vertical frame members to define two upper corners; the door frame defining a door opening for the cargo hold;
    a door having a lower door portion; the door being movable between open and closed positions with respect to the cargo hold of the truck; the closed position of the door closing the door opening;
    an opening and closing mechanism for opening and closing the door; the opening and closing mechanism having first and second guides and a loop having portions passing over the first and second guides in a manner that allows the loop to be moved with respect to the guides;
    the positions of the first and second guides being fixed with respect to the door frame;
    the loop being disposed outside of the cargo hold when the door is closed such that the loop is readily accessible for manipulation by a person opening the door;
    a portion of the loop disposed between the first and second guides being anchored to the lower door portion; and
    the loop being adapted to raise the door from its closed position toward its open position and then lower the door from its open position towards its closed position when pulled down toward the ground.

2. The truck of claim 1, wherein the loop is disposed along the first vertical frame member.

3. The truck of claim 1, wherein the loop is defined by a flat strap.

4. The truck of claim 3, wherein the flat strap is made from a woven polymer.

5. The truck of claim 1, wherein at least one of the guides includes a bar.

6. The truck of claim 5, further comprising a roller carried by the bar.

7. The truck of claim 1, wherein the loop is disposed vertically.

8. The truck of claim 1, further comprising a floor; the door abutting the floor in the closed position of the door; the second guide being disposed under the floor.

9. An improved opening and closing mechanism for a cargo truck door on a cargo truck wherein the cargo truck has an enclosed cargo hold with a door frame defined by spaced first and second vertical frame members and an upper cross frame member that is joined to the first and second vertical frame members to define two upper corners; the door frame defining a door opening for the cargo hold; and a door having a lower door portion; the door being movable between open and closed positions with respect to the cargo hold of the truck; the closed position of the door closing the door opening; the improvement comprising:

the opening and closing mechanism having first and second guides; and a loop having portions passing over the first and second guides in a manner that allows the loop to be moved with respect to the guides;

the positions of the first and second guides being fixed with respect to the door frame;

the first guide being connected to the truck at a location above the lower portion of the door when the door is in the open position;

the loop being disposed outside of the cargo hold when the door is closed such that the loop is readily accessible for manipulation by a person opening the door;

a portion of the loop disposed between the first and second guides being anchored to the lower door portion; and the loop being adapted to raise the door from its closed position toward its open position and then lower the door from its open position towards its closed position when pulled down toward the ground.

10. The improvement of claim 9, wherein the loop is disposed along the first vertical frame member.

11. The improvement of claim 9, wherein the loop is defined by a flat strap.

12. The improvement of claim 11, wherein the flat strap is made from a woven polymer.

13. The improvement of claim 9, wherein at least one of the guides includes a bar.

14. The improvement of claim 13, further comprising a roller carried by the bar.

15. The improvement of claim 9, wherein the loop is disposed vertically.

16. The improvement of claim 9, wherein the cargo truck includes a floor; the door abutting the floor in the closed position of the door; the second guide being disposed under the floor.

* * * * *